United States Patent
Krause et al.

(10) Patent No.: US 10,589,365 B2
(45) Date of Patent: Mar. 17, 2020

(54) APPARATUS FOR CUTTING CORRUGATED PIPES TO LENGTH

(71) Applicant: Rothenberger AG, Kelkheim (DE)

(72) Inventors: Thoralf Krause, Leipzig (DE); Arnd Greding, Hofheim (DE)

(73) Assignee: ROTHENBERGER AG, Kelkheim (DE)

( * ) Notice: Subject to any disclaimer, the term of this patent is extended or adjusted under 35 U.S.C. 154(b) by 841 days.

(21) Appl. No.: 14/362,947

(22) PCT Filed: Nov. 8, 2012

(86) PCT No.: PCT/DE2012/100343
§ 371 (c)(1),
(2) Date: Jun. 5, 2014

(87) PCT Pub. No.: WO2013/083119
PCT Pub. Date: Jun. 13, 2013

(65) Prior Publication Data
US 2014/0366382 A1    Dec. 18, 2014

(30) Foreign Application Priority Data
Dec. 5, 2011    (DE) .................. 10 2011 056 040

(51) Int. Cl.
*B23D 21/08*  (2006.01)
*B23D 33/10*  (2006.01)
(Continued)

(52) U.S. Cl.
CPC .............. *B23D 21/08* (2013.01); *B23D 21/06* (2013.01); *B23D 33/10* (2013.01); *B26D 3/16* (2013.01);
(Continued)

(58) Field of Classification Search
CPC ........ B23D 21/08; B23D 21/06; B23D 21/00; B23D 33/10; B26D 3/16; B26D 3/169
(Continued)

(56) References Cited

U.S. PATENT DOCUMENTS 5,487,220 A * 1/1996 Saitou .................. H02G 1/1231
30/90.6
5,809,652 A * 9/1998 Ducret ................. H02G 1/1231
30/90.7
(Continued)

FOREIGN PATENT DOCUMENTS

CH    682471 A5 *  9/1993  ............... B26D 3/16
CH    682471 A5    9/1993
(Continued)

OTHER PUBLICATIONS

CH-682471-A5 English Translation Sep. 1993 CH Lanz Wener.*
(Continued)

*Primary Examiner* — Laura M Lee
(74) *Attorney, Agent, or Firm* — Smartpat PLC (57) ABSTRACT

An apparatus for cutting corrugated pipes to length includes a clamping device configured to act radially with respect to an axis so as to fix a corrugated pipe in a machining position. The apparatus also includes a cutting tool moveable into an active position against the corrugated pipe in the machining position and configured to bring about a separation by moving the cutting tool and corrugated pipe relative to one another. A stop device is configured to engage in a corrugation trough of the corrugated pipe wherein a spacing between the cutting tool and stop device is variable in the axial direction with respect to the axis.

26 Claims, 8 Drawing Sheets

(51) Int. Cl.
    B26D 3/16      (2006.01)
    B23D 21/06     (2006.01)
    B26D 7/01      (2006.01)
    B23D 35/00     (2006.01)

(52) U.S. Cl.
    CPC ............ B26D 3/169 (2013.01); *B23D 35/004* (2013.01); *B26D 2007/013* (2013.01); *Y10T 83/6574* (2015.04)

(58) Field of Classification Search
    USPC ...................................... 30/96, 97, 101, 102
    See application file for complete search history.

(56) References Cited

U.S. PATENT DOCUMENTS 6,401,340 B1 * 6/2002 King ..................... B23D 21/08
                                                    30/101
7,464,737 B2 * 12/2008 Duginske ................ B27B 27/02
                                                    144/253.1
2010/0199499 A1    8/2010 Dibble

FOREIGN PATENT DOCUMENTS

| | | |
|---|---|---|
| DE | 29501197 U1 | 3/1995 |
| DE | 60100137 T2 | 9/2003 |
| JP | 02256414 A | 10/1990 |

OTHER PUBLICATIONS

International Search Report of PCT/DE2012/100343, dated May 17, 2013.

International Preliminary Report on Patentability and Written Opinion of the International Searching Authority of PCT/DE2012/100343, dated Jun. 10, 2014.

* cited by examiner

APPARATUS FOR CUTTING CORRUGATED PIPES TO LENGTH

CROSS REFERENCE TO RELATED APPLICATIONS

This application is a U.S. National Phase application under 35 U.S.C. § 0.371 of International Application No. PCT/DE2012/100343, filed on Nov. 8, 2012, and claims benefit to German Patent Application No. 10 2011 056 040.8, filed on Dec. 5, 2011. The International Application was published in German on Jun. 13, 2013 as WO 2013/083119 A1 under PCT Article 21 (2).

FIELD

The invention relates to an apparatus for cutting corrugated pipes to length, having a clamping device, which acts radially with respect an axis, to fix a corrugated pipe in a machining position, and having a cutting tool, which is moved or movable into an active position against the corrugated pipe in the machining position, so separation is brought about by moving the cutting tool and corrugated pipe relative to one another.

BACKGROUND

Apparatuses of the type mentioned here, which are also called corrugated pipe cutters, are used to separate the pipe having corrugations, the so-called corrugated pipe. A corrugated pipe of this type is a rotation body with a circular or other cross-section, the wall of which has substantially sinusoidal corrugations with a uniform or non-uniform profile.

Corrugated pipes are used more and more often in solar thermal technology and are used there, for example, as heat exchangers as, because of their corrugated structure, the corrugated pipes have a relatively large surface and therefore encourage heat transfer. The corrugated pipes are also used in heating and sanitary engineering and in various industrial applications.

Apparatuses for cutting corrugated pipes to length generally have a clamping device, by means of which the corrugated pipe to be cut to length is held clamped in a machining position. The corrugated pipe is then cut to length by means of a cutting wheel, which is moved into an active position against the corrugated pipe in the machining position, so a separation is brought about by moving the cutting wheel around the corrugated pipe.

An apparatus of this type is known from the Applicant's product catalogue (main catalogue 2008, pages 112 and 113). The apparatus or pipe separator is described there for separating a non-corrugated pipe, even if it is also suitable for cutting a corrugated pipe to length.

It has been shown that the cutting tool slides away laterally from its position set on the corrugated pipe during the cutting movement guided around the corrugated pipe when the cutting tool is set on the tip or the apex of a corrugation or on a flank of a corrugation. The result of this is that the separation edge runs non-uniformly over the periphery of the corrugated pipe in the axial direction with respect to the pipe axis.

A separation edge running in this manner makes the fastening of the corrugated pipe in a pipeline system or to any connection pieces more difficult and leads to leaks resulting in undesired flow turbulences within the pipe.

DE 601 00 137 T2 describes a possibility, by means of which a corrugated pipe can be cut along a corrugation apex, without the cutting tool sliding off laterally during the separating process. A pipe separator is described there, which is pressed onto the surface of a corrugated pipe to be cut and has two projections, which are arranged at an axial spacing with respect to the longitudinal axis of the corrugated pipe and engage in mutually adjacent corrugation troughs. A cutting tool, which is set on a corrugation apex of the corrugated pipe by the engagement of the projections in the two corrugation troughs and remains on the corrugation apex without laterally sliding away because of the engagement of the projections during the cutting movement around the pipe, is arranged between the projections.

The projections and the cutting tool have a fixed arrangement with respect to one another in this known corrugated pipe separator. Only corrugated pipes, the corrugations of which extend in the direction of the pipe axis in the same manner, can be cut thereby. The known corrugated pipe separator is also arranged to cut corrugated pipes to length at a respective corrugation apex.

SUMMARY

In an embodiment, the present invention provides an apparatus for cutting corrugated pipes to length. A clamping device is configured to act radially with respect to an axis so as to fix a corrugated pipe in a machining position. A cutting tool is movable into an active position against the corrugated pipe in the machining position and configured to bring about a separation by moving the cutting tool and corrugated pipe relative to one another. A stop device is configured to engage in a corrugation trough of the corrugated pipe wherein a spacing between the cutting tool and stop device is variable in the axial direction with respect to the axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides an apparatus for cutting corrugated pipes to length having the features mentioned at the outset, by means of which a corrugated pipe can be cut to length, depending on the requirement, at the corrugation base or at the corrugation apex, but also at a flank of a corrugation. Moreover, the apparatus should allow a cutting to length of corrugated pipes that have corrugations that run differently with respect to one another in the direction of the pipe axis.

An apparatus according to an embodiment of the invention for cutting corrugated pipes to length has a clamping device, which acts radially with respect to an axis, to fix a corrugated pipe in a machining position, preferably in that the clamping mechanism is movable or moved into an active position in a peripherally clamping manner against the corrugated pipe. The axis preferably coincides with the pipe axis or the centre axis of the corrugated pipe.

The apparatus furthermore has a cutting tool, which is moved or movable into an active position against the corrugated pipe in the machining position, so a separation is brought about by moving the cutting tool and corrugated pipe relative to one another. The cutting tool is moved or movable into an active position against the corrugated pipe in the machining position in such a way that by twisting or rotating the cutting tool and corrugated pipe relative to one another about a common rotational axis, a separation or a separating process is brought about. For example, a separation can be brought about by moving the cutting tool about the corrugated pipe. The cutting tool preferably makes a rotational movement for this purpose about a rotational axis, which coincides with the centre axis of the corrugated pipe.

The apparatus according to an embodiment of the invention is preferably actuated, or can be actuated, manually with respect to the clamping device and/or the actuation of the cutting tool in order to be able to cut the corrugated pipes to length with a technically low outlay, in a simple manner and on site. Obviously, the apparatus can also be actuated by a motor, in particular an electric motor, with respect to the clamping device and/or the actuation of the cutting tool.

According to an embodiment the invention, the apparatus has a stop device, which engages, or can engage, in a corrugation trough of the corrugated pipe, the spacing between the cutting tool and the stop device being variable in the axial direction with respect to the axis.

Owing to this measure, the cutting tool, depending on the requirement, can be placed on a corrugation base, a corrugation apex or a corrugation flank of a corrugation of a corrugated pipe. During the separation movement to cut a corrugated pipe to length, the cutting tool is forcibly guided by means of the stop device in the axial direction in the respective set position on the corrugation base, the corrugation apex or the corrugation flank, so a severing of the corrugated pipe is completed without a position change of the cutting tool in the direction of the axis. During a separation of the corrugated pipe on a corrugation apex, sliding into the adjacent corrugation trough is thereby avoided in the course of the cutting movement, for example by moving the cutting tool around the corrugated pipe. A separation of the corrugated pipe on an obliquely oriented flank of a corrugation is also thereby possible without the cutting tool sliding off during the separating process.

The stop device uses the corrugated contour of a corrugated pipe in that the stop device engages in at least one constriction of the corrugated pipe forming a corrugation trough and therefore the external contour of the corrugated pipe comes to abut the stop device in this region. A positioning of the corrugated pipe is thus achieved relative to the stop device and at the same time relative to the cutting tool in the axial direction with respect to the axis.

Corrugated pipes can thus be separated without problems at the corrugation base, the corrugation apex or at a flank of a corrugation with one cut substantially perpendicular to the axis or longitudinal axis of the corrugated pipe by the stop device provided according to the invention, independently of the configuration of the corrugation shape of the respective corrugated pipe. A cut of this type is possible in corrugated pipes with a relatively large axial extent of a respective corrugation and also in corrugated pipes with a relatively small axial extent of a respective corrugation.

It is also possible to cut a corrugated pipe, in which the corrugation shape changes in the direction of the pipe axis, by the apparatus according to the invention. The variability of the spacing between the cutting tool and the stop device in the axial direction means that an individual adaptation to the respectively present corrugation shape of a respective corrugated pipe is possible in a flexible manner. The cut position in relation to the corrugation geometry of a corrugated pipe to be separated is thus variable, in particular adjustable, owing to the invention.

The corrugated pipes may consist of any desired material. The apparatus according to the invention is suitable both for cutting corrugated pipes made of plastics material to length and for cutting corrugated pipes made of metal to length.

It is provided according to one configuration of the invention that the stop device is variable, with regard to their spacing in relation to the cutting tool in the axial direction with respect to the axis. An individual and flexible adaptation to the respectively present corrugation shape of a respective corrugated pipe is thus possible in a technically simple manner. The cut position of the cutting tool can thus be adjusted in a technically simple manner with respect to the corrugation geometry of the corrugated pipe, in that the stop device, in their axial position with respect to the axis, are moved in a targeted manner into an intended stop position, for example against a flank of a corrugation trough of the corrugated pipe.

Obviously, it may also be provided that the stop device is non-variable, in other words fixed, in the axial direction with respect to the axis and, instead, the cutting tool is variable in the axial direction with respect to the axis.

It is furthermore conceivable that both the stop device and the cutting tool are in each case variable in the axial direction with respect to the axis.

The spacing between the cutting tool and the stop device is preferably variable in the axial direction with respect to the axis, in that the cutting tool and/or the stop device is moved in the axial direction.

It is advisable that when the corrugated pipe is fixed and/or when the cutting tool is moved into the active position on the corrugated pipe, the stop device can be varied with respect to their spacing in relation to the cutting tool in the axial direction with respect to the axis. As a result, particularly easy handling of the stop device is made possible for the user of the device. The corrugated pipe can namely firstly be fixed in a predetermined position in the axial direction with respect to the cutting tool and the user is then also given the possibility of varying the stop device with respect to their spacing in relation to the cutting tool in such a way that the stop device is moved into a predetermined stop position in relation to the corrugated pipe.

It is furthermore advisable for the stop device to cooperate with adjusting device, by which the stop device can be adjusted with regard to their spacing in relation to the cutting tool in the axial direction with respect to the axis. As a result, the stop device can be moved precisely into the predetermined stop position on the corrugated pipe with easy handling for the user in the axial direction with respect to the axis in order to carry out the intended substantially perpendicular cut with respect to the pipe axis by means of the cutting tool with forcible guidance by the stop device.

The adjusting device can be realised in a technically simple manner if, according to one configuration of the invention, the adjusting device is formed by a screw mechanism, which can preferably be actuated from outside. As a result, a particularly user-friendly adjustment of the stop device is achieved.

According to one configuration of the invention it is provided that the stop device is arranged on a base body having a handle part. This measure also aims to allow the user to cut the corrugated pipe to length with easy handling. The base body is to be grasped by the user, preferably using one hand, by means of the handle part.

Particularly easy handling is produced if, according to an advantageous configuration of the invention, in addition to the stop device, the clamping device is also arranged on the base body or at least partially formed by the base body. By grasping the handle part, the entire apparatus according to the invention is to be held in one hand, so the separating process is substantially simplified when cutting the corrugated pipe to length.

According to a further configuration of the invention, it is provided that the stop device is movably mounted on the base body in the axial direction with respect to the axis. An adjusting mechanism is thus realised in a technically simple manner, by means of which the stop device can be moved in the axial direction relative to the cutting tool.

According to a further configuration of the invention, it is provided that the stop device has at least one stop face, which is movable against a flank of a corrugation of the corrugated pipe in the machining position. This ensures that the stop device can be reliably moved in an axial direction to abut against a flank of a corrugation of the corrugated pipe and thus a sliding off of the cutting tool during a peripheral cutting movement around the corrugated pipe is avoided by the forcible guidance produced by the face.

A further configuration of the invention consists in that the stop device has two stop faces, which, in the machining position are selectively movable against flanks of corrugations, in particular adjacent corrugations, which are directed in the opposite manner to one another. As a result, the stop device in the position engaged in a corrugation trough on the corrugated pipe can be moved into the stop position with one of the faces against a flank, in each case, the flanks being flanks of corrugations directed in the opposite manner to one another.

The stop device therefore prevents the cutting tool being able to slide away laterally in the one axial direction relative to the corrugated pipe during the cutting process, in that one of the stop faces acts as a stop and is used as a forcible guide for the corrugated pipe in the course of the cutting process. If, during the cutting to length of the corrugated pipe, the cutting tool can slide off in the other axial direction, for example if the cutting tool is set on a flank of a corrugation oriented in the opposite manner to the previous cut, a lateral sliding off can be prevented by means of the other stop face, in that the other stop face is moved into active contact on the flank directed in the opposite manner, and is then used as a forced guidance in the course of the cutting movement.

According to a preferred configuration of the invention, it is provided that the stop device is formed by an outward projection of a support and/or guide element being used as a support and/or guide for the corrugated pipe, which support and/or guide element is preferably axially movable with respect to the axis. A plurality of functions with respect to the corrugated pipe is therefore combined in one component. The support and/or guide element, apart from its support or guide function with respect to the corrugated pipe, also has the function of forming the stop device according to the invention by means of the projection. A high functional integrity is thus realised with a single component, so the outlay and costs can be kept low. An improved cutting process by means of a cutting tool is produced by means of the support or guide element, as the corrugated pipe is additionally supported or guided in the radial direction against the acting cutting forces by the support or guide element during the separating process.

It is advisable that the support and/or guide element is arranged coaxially with respect to a clamping element of the clamping device. An arrangement of this type is to be realised in a technically simple manner, as the clamping element and support or guide element can be arranged on a common axis or corrugation. To this extent, it is easily possible to in each case rotatably movably mount the clamping element and support or guide element on the common axis or corrugation, so a rolling movement relative to the corrugated pipe is made possible in the machining position both by the support or guide element and by the clamping element. Thus, a relative rotational movement, carried out in the course of the separating process, of the corrugated pipe and the clamping elements of the clamping device about the centre axis of the corrugated pipe can be carried out with a relatively low force to be applied by the user.

According to a further configuration of the invention it is provided that the support and/or guide element is rotatably mounted on a threaded bolt, which, for movement in the axial direction with respect to the axis, cooperates with a counter-thread of the base body. As a result, the apparatus according to the invention is to be realised in a technically simple manner.

The support and/or guide element may be formed by a rotatably movable roller. Furthermore, the projection may be formed by an outwardly projecting collar on the rotatably movable roller. The collar is preferably moulded on the roller, the contour of the collar being able to be configured in the manner of a disc.

Owing to the collar-like configuration of the projection on the rotatably movable roller, the support or guide element can roll along the outer periphery of the corrugated pipe and, in the process, engages continuously with the collar in a corrugation trough of the corrugated pipe, so the stop function and guide function of the stop device is configured as a collar according to the invention and acts during the cutting process of the corrugated pipe.

Since the collar has the contour of a disc, in particular a thin-walled disc, the collar can engage in corrugation troughs of corrugated pipes of any corrugation configurations and act as a stop or guide in the course of the separating process. The support and/or guide element is to be realised with adequate strength if, according to a further configuration of the invention, it is a metal part. The support and/or guide element is preferably an aluminium part. Thus, the support or guide element is relatively light in terms of weight and protected against corrosion.

A further configuration of the invention provides that the clamping device has at least one clamping element, which can be moved substantially radially with respect to the axis and is formed by the cutting tool. As a result, in the course of fixing the corrugated pipe in the clamping device, the cutting tool in the active position moves against the corrugated pipe with the exertion of a clamping force. Depending on the clamping force applied against the corrugated pipe, the cutting tool is therefore simultaneously brought into the active position on the corrugated pipe to carry out the separating process by a relative movement of the corrugated pipe relative to the cutting tool, preferably a repeated rotation of the cutting tool around the corrugated pipe.

The cutting tool is preferably configured for this purpose as a rotatably movable cutting wheel, which, rotating about its centre axis, rolls on the outer periphery of the corrugated pipe in the course of the separating process.

Since the clamping element is substantially radially movable with respect to the axis, the clamping force acting on the corrugated pipe can be adjusted to a predetermined value. For this purpose, a corresponding adjusting device is preferably provided, which can be configured on the base body of the apparatus according to the invention. The clamping element that can be moved radially with respect to the axis is preferably also movably mounted on the base body.

According to a further configuration of the invention or according to an independent idea, a joint device is provided, by which the cutting tool is movable into a predeterminable or predetermined oblique position with respect to the axis. As a result, the cutting tool can also be moved particularly easily with its cutting tip onto the rounded region of a corrugation adjoining a corrugation apex into the cutting position, in that the cutting tool is moved into an oblique position such that the cutting tool is radially oriented with respect to this rounded corrugation portion and, in this orientation, comes to abut against the corrugation portion with its cutting tip.

It is advisable for an adjusting mechanism to be provided, by which an orientation of the cutting tool into a selected or intended oblique position is achieved or adjusted. The cutting tool should preferably be fixable, in particular lockable, in the respective oblique position.

Furthermore, proceeding from a starting position, in which the cutting tool is substantially perpendicular to the axis or the centre axis of the corrugated pipe, it should be possible to move the cutting tool on both sides in the axial direction into an oblique position with respect to the axis or centre axis of the pipe. As a result, the cutting tool is to be moved particularly flexibly into an orientation relative to the corrugated pipe in order to be able to move the cutting tool optimally oriented into the cutting position as far as possible at any desired point of a corrugation. According to a preferred configuration of the invention, the joint is arranged associated with the base body or on the base body.

A possible configuration of the invention consists in that the joint device is formed by a pivot joint arranged on the base body, by means of which a part of the base body holding the cutting tool can be moved into a predetermined angular position relative to a part holding at least one clamping element of the clamping device about a pivot axis running substantially transversely to the axis. A configuration of this type can be realised in a technically simple manner.

Further aims, advantages, features and application possibilities of the present invention emerge from the following description of an embodiment with the aid of the drawings. In this case, all the described and/or graphically shown features, per se or in any desired sensible combination, form the subject matter of the present invention, even independently of their combination in the claims or their reference back.

Figure 1:
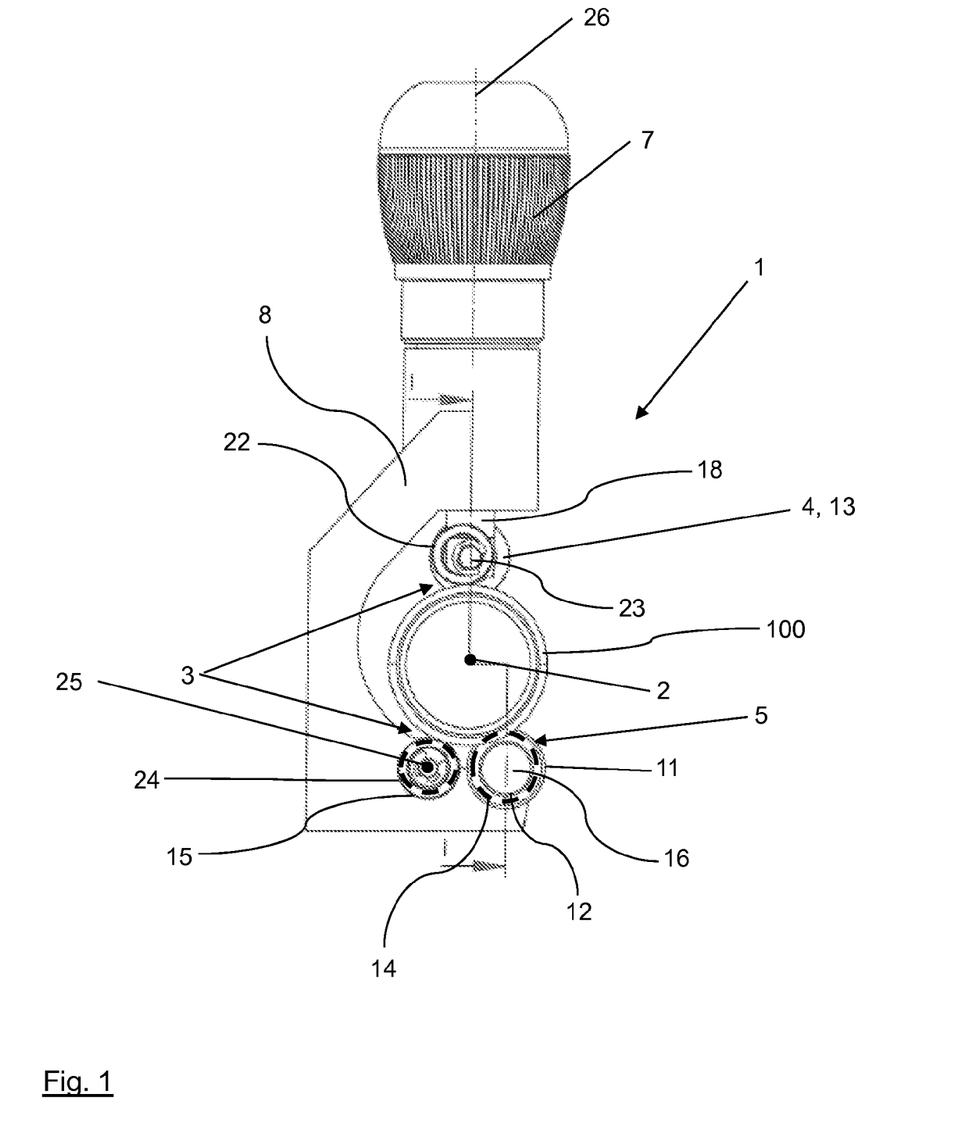
FIG. 1 shows a possible embodiment of an apparatus according to the invention for cutting corrugated pipes to length in a side view together with a received corrugated pipe.

FIG. 1 shows—in a schematic view—a possible embodiment of an apparatus 1 for cutting corrugated pipes to length in a side view. The apparatus 1 is shown together with a corrugated pipe 100 to be cut to length.

The apparatus 1 has a clamping device 3, by means of which the corrugated pipe 100 to be cut to length can be fixed in a machining position. In FIG. 1, the corrugated pipe 100 is already moved into the machining position and fixed by means of the clamping device 3.

Furthermore, the apparatus 1 has a cutting tool 4, which is moved into an active position against the corrugated pipe 100 in this machining position, so by moving the cutting tool 4 and corrugated pipe 100 relative to one another, a separation is brought about, in that, for example, the cutting tool 4 is moved around the corrugated pipe 100.

In order to fix the corrugated pipe 100 in the machining position, the clamping device 3 acts radially with respect to an axis 2, which preferably coincides with the centre axis of the corrugated pipe 100, which is received and fixable or fixed in the machining position. In order to fix the corrugated pipe 100 in the machining position, the clamping device 3 is moved into an active position in a peripherally clamping manner against the corrugated pipe 100.

The clamping device 3 is formed on a base body 8, which has a handle part 7 for the user of the apparatus 1 to grasp. By means of the handle part 7, the user can grasp the apparatus 1 with one hand and hold it in one hand and thus cut the corrugated pipe 100 to length by means of actuation with one hand, in that, for example, the apparatus 1 is moved with its corrugated pipe 100 received in the machining position against the cutting tool 4 abutting the corrugated pipe 100 around the corrugated pipe 100 and the cutting to length of the corrugated pipe 100 is thus brought about.

To fix the corrugated pipe 100 in the machining position, the clamping device 3 has at least three clamping elements 13, 14 and 15, which act on the periphery of the corrugated pipe 100. The clamping element 13 is at least partially visible in the view according to FIG. 1. The clamping elements 14 and 15, in the view according to FIG. 1, are covered by other components of the apparatus 1, the respective outer peripheral contour of which being indicated by a dashed line.

Of the clamping elements 13, 14 and 15, the clamping elements 14 and 15 are arranged on the base body 8, in particular configured stationarily with respect to the base body 8. The clamping elements 14 and 15 are located at a spacing from one another, so the clamping elements 14 and 15 are used as a receiver for the corrugated pipe 100 in order to be able to peripherally place the corrugated pipe 100 thereon. In FIG. 1, the apparatus 1 is shown in such a way that the handle part 7 points upwardly and the clamping elements 14 and 15 rest on the lower end region of the base body 8, so the corrugated pipe 100 placed on the clamping elements 14 and 15 remains placed on by its own weight before the clamping by means of the clamping device 3.

The clamping element 13 is mounted on the base body 8 in a translatory movable manner and can be moved in a translatory manner from a starting position in the direction toward the clamping elements 14 and 15. A clamping of the corrugated pipe 100 is achieved in that the corrugated pipe 100 is, on the one hand, moved between the clamping element 13 and the clamping elements 14 and 15, on the other hand, and the clamping element 13 is then moved in a translatory manner from the starting position in the direction toward the corrugated pipe 100 until a clamping of the corrugated pipe 100 occurs between the clamping elements 13, 14 and 15. The corrugated pipe 100 is then fixed in the machining position. In the machining position, the clamping elements 13, 14 and 15 act in the radial direction with respect to the axis 2 on the periphery of the corrugated pipe 100.

The handle part 7 is preferably a component of an actuating mechanism, by means of which the clamping element 13 can be moved in a translatory manner. The handle part 7 is preferably configured for this purpose as a rotary part, so by rotating the handle part 7, for example about its own longitudinal axis 26, a translatory adjusting movement of the clamping element 13 occurs, for example in that a screw and/or thread mechanism is interposed. The actuating mechanism or screw and/or thread mechanism means that the clamping element 13 remains in the position shown against the corrugated pipe 100 and therefore the clamping force of the clamping device 3 is maintained.

The clamping element 13 that can be moved in a translatory manner is preferably formed by the cutting tool 4 itself. The clamping of the corrugated pipe 100 in the machining position thus takes place by means of the cutting tool 4 itself, which is pressed against the outer periphery of the corrugated pipe 100. As a result, a clamping of the corrugated pipe 100 occurs between the cutting tool 4 and the clamping elements 14 and 15. Owing to a further increased clamping force, the cutting tool 4 presses with its cutting edge into the peripheral wall of the corrugated pipe 100, so a severing of the peripheral wall of the corrugated pipe 100 occurs owing to a subsequent rotational movement of the apparatus 1 relative to the corrugated pipe 100.

The cutting tool 4 is preferably configured for this purpose as a cutting wheel, which is rotatably movably held about its centre axis on a guide element 18 that can be moved in a translatory manner by means of the handle part 7. The clamping elements 14 and 15 are preferably configured in each case as a roller or sphere, which are preferably rotatably movably mounted about their own centre axis on the base body 8.

Figure 2:
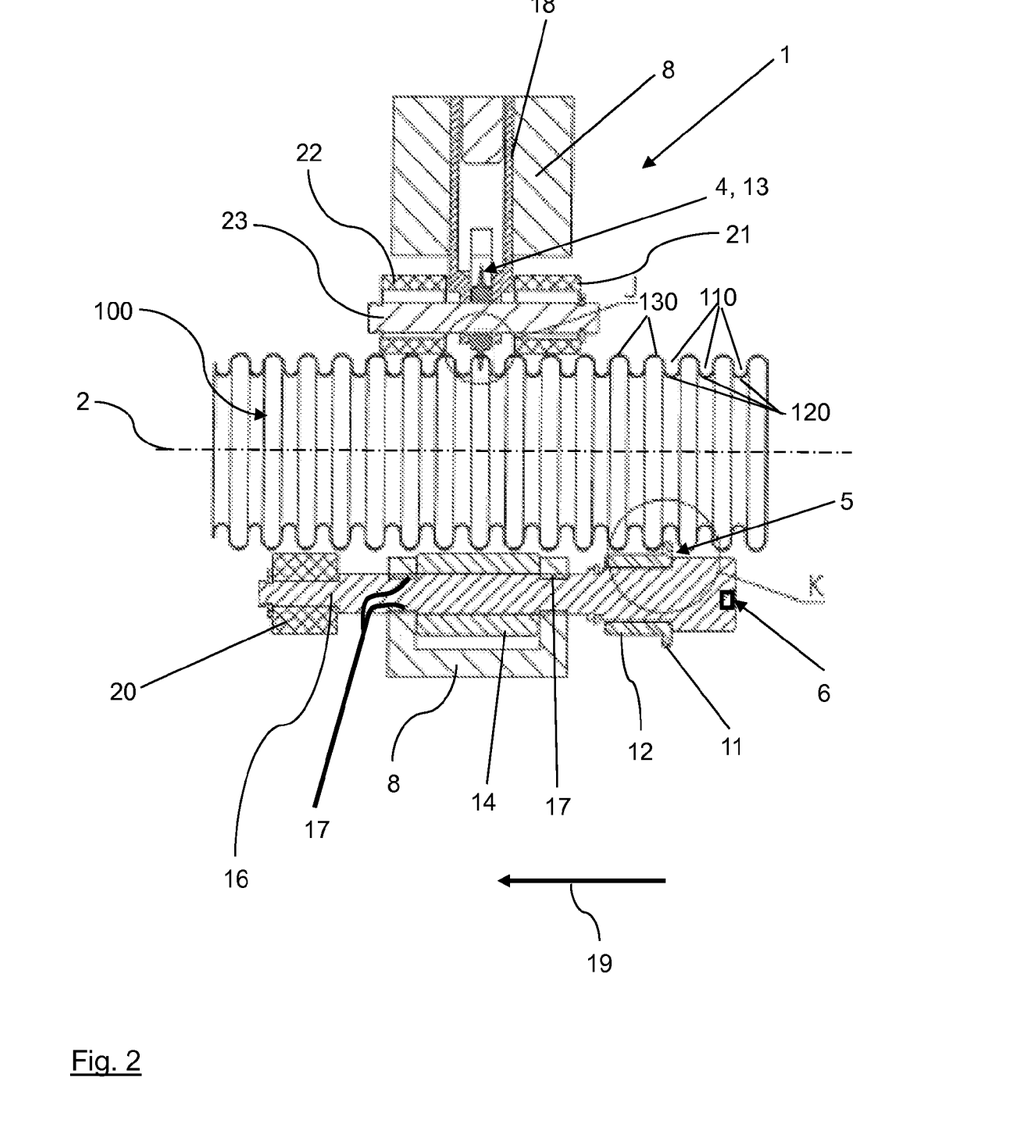
FIG. 2 shows the apparatus according to FIG. 1 in a sectional view along the section line I-I of FIG. 1 with a cutting tool engaging on a corrugation apex of a corrugated pipe.

FIG. 2 shows the apparatus 1 in the region of the corrugated pipe 100 in a sectional view. As can be seen from viewing FIGS. 1 and 2 together, the apparatus 1 has stop device 5, which engage in a corrugation trough 110 of the corrugated pipe 100 and can be varied with regard to their spacing in relation to the cutting tool 4 in the axial direction with respect to the axis 2.

In the course of the invention, the corrugation trough 110 is to be taken to mean the depression formed between two adjacent corrugations that ends in a corrugation base 120. Proceeding from the corrugation base 120, each corrugation runs to the respective corrugation apex 130, which substantially forms the outwardly projecting tip of a respective corrugation of the corrugated pipe 100.

Figure 3A:
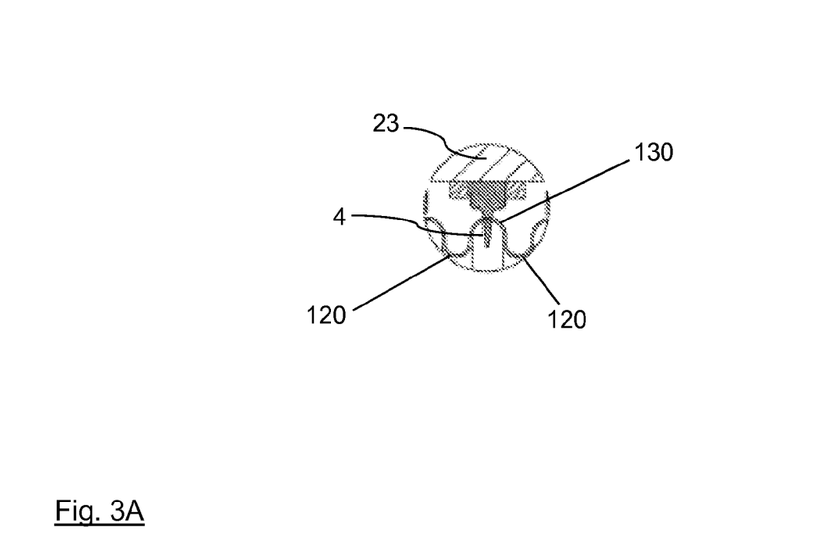
FIG. 3*a* shows an enlarged detailed view of the region J characterised in FIG. 2.

As can be seen from FIG. 2 and, in particular, from the enlarged detailed view in FIG. 3a, the cutting tool 4 is moved into an active position on a corrugation apex 130 of the corrugated pipe 100 in the machining position. Proceeding from this orientation of the cutting tool 4, the stop device 5 is adapted in the axial direction with respect to the axis 2 to such an extent that the stop device 5 acts as an abutment or stop against a side wall or flank of a corrugation of the corrugated pipe 100.

In the course of the separating process of the corrugated pipe 100 by rotating the apparatus 1 or the cutting tool 4 relative to the corrugated pipe 100, in particular by rotating the cutting tool 4 around the corrugated pipe 100, the stop device 5 slide along the side wall of the one corrugation, so the apparatus 1 or the cutting tool 4 is thereby guided in the axial direction with respect to the axis 2 and consequently a sliding of the cutting tool 4 relative to the corrugated pipe 100 in the axial direction according to the arrow 19 is avoided. Owing to the stop device 5, a separation of the corrugated pipe 100 by a rotational movement of the cutting tool 4 relative to the corrugated pipe 100 about the axis 2 with a substantially perpendicular cut with respect to the axis 2 is therefore possible.

Figure 3B:
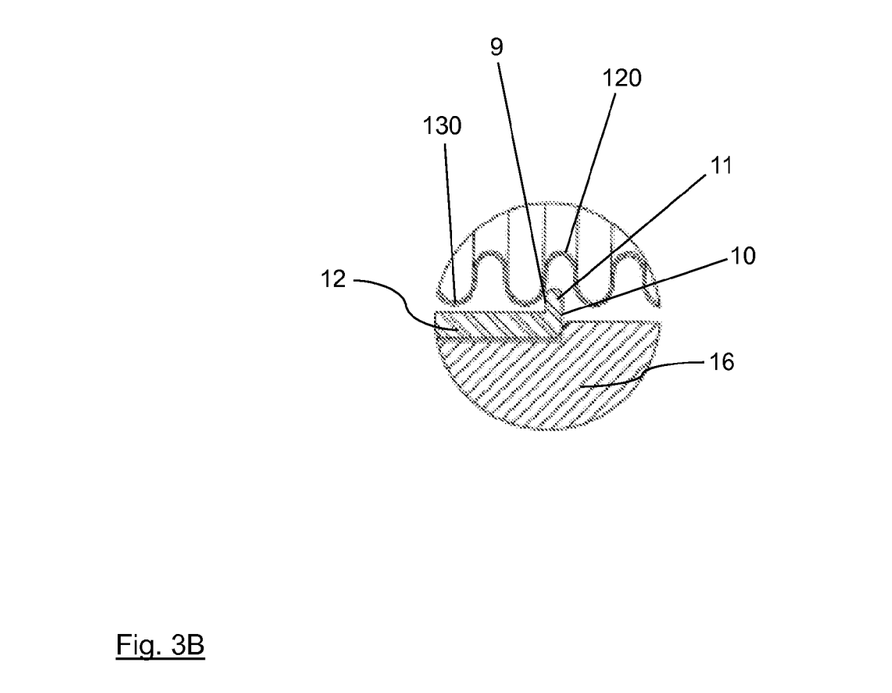
FIG. 3*b* shows an enlarged detailed view of the region K characterised in FIG. 2.

FIG. 3b shows the detail K of FIG. 2 in an enlarged view. As can be seen therefrom and from FIG. 2, the stop device 5 is preferably formed by an outward projection 11, which may be formed, for example, peripherally, in particular by a peripheral collar. The projection 11 is furthermore preferably formed on a support and/or guide element 12, in particular moulded thereon, the support and/or guide element 12 being used as a guide or support for the corrugated pipe 100 in the radial direction.

The stop device 5, in particular the projection 11, preferably has two stop faces 9 and 10, which are selectively movable against one of the flanks directed in the opposite manner to one another of adjacent corrugations in the machining position.

As can be seen in particular from FIG. 2, the stop device 5 cooperates with an adjusting device 6, by which the stop device 5 can be adjusted with regard to their spacing in relation to the cutting tool 4 in the axial direction with respect to the axis 2. The adjusting device 6 may be formed by a screw mechanism, which can be actuated from the outside. For this purpose, it may be provided that the support or guide element 12 is arranged on a bolt 16, in particular rotatably mounted on the bolt 16 about its own centre axis, the bolt 16 having a thread, which meshes with a counter-thread 17, for example of the base body 8, so by rotating the bolt 16, a feed movement in the axial direction with respect to the axis 2 takes place.

The support or guide element 12 is preferably stationarily arranged on the bolt 16 in the axial direction with respect to the axis 2, so by means of the feed movement of the bolt 16, the support or guide element 12 together with its projection 11 acting as a stop device is also moved in the axial direction with respect to the axis 2.

The bolt 16 may be configured as a screw head at its outer end, so, for example, a rotational movement of the bolt 16 can be carried out by means of a screwdriver and therefore an adjustment of the stop device 5 in the axial direction with respect to the axis 2 can be carried out. The adjustment of the stop device 5 in the axial direction with respect to the axis 2 is also possible when the corrugated pipe 100 is present, already clamped in the machining position.

As can be seen, in particular from FIGS. 1 and 2, the apparatus 1 preferably has further support and/or guide elements 20, 21 and 22, which are used to guide or support the corrugated pipe 100 in the radial direction during the separating process.

The support and/or guide element 20 is preferably arranged on the bolt 16, in particular rotatably mounted about its centre axis on the bolt 16. The support and/or guide element 20 and the support and/or guide element 12 provided with the projection 11 are preferably arranged in the end regions of the bolt 16, two thread-meshing regions of the thread of the bolt 16 and counter-thread 17 being located there between and the clamping element 14 in turn being arranged between the two thread-meshing regions. The clamping element 14 and support and/or guide elements 20 and 12 are preferably arranged here coaxially to the centre axis of the bolt 16.

The support and/or guide elements 21 and 22 are arranged in the region of the cutting tool 4, the cutting tool 4, preferably configured as a rotary disc, together with the support and/or guide elements 21 and 22, preferably being arranged coaxially with respect to a common pin element 23 and the cutting tool 4 with the guide element 18 being arranged between the support and/or guide elements 21 and 22. The cutting tool 4, support and/or guide elements 21 and 22 are preferably rotatably movable about the pin element 23 and preferably substantially stationarily fastened in the axial direction on the pin element 23.

As can be seen, in particular, from FIG. 2, the support and/or guide elements 21 and 22 have an inner periphery, the diameter of which is greater than the external diameter of the pin element 23, so the support and/or guide elements 21 and 22 have a desired play relative to the pin element 23 in the radial direction to allow the cutting tool 4 to enter the wall of the corrugated pipe 100 before the outer wall of the corrugated pipe 100 come to abut the support and/or guide elements 21 and 22. The play furthermore makes it possible for the cutting tool 4 to be set both on the corrugation apex 130 and on the corrugation base 120 of the corrugations of the corrugated pipe 100 despite the support and/or guide elements 21 and 22 and a separation of the corrugated pipe 100 takes place at this respective region.

As can also be seen from FIG. 1, arranged coaxially to the clamping element 15 is at least one support and/or guide element 24, which is used as a support and/or guide for the corrugated pipe 100 in the radial direction. With regard to the clamping element 15, a pin element 25 may also be provided, on which, on the one hand, the support and/or guide element 25 and a further support and/or guide element (not visible in FIG. 1) are arranged and the clamping element 15 is located in between, the support and/or guide element (not visible in FIG. 1), the support and/or guide element 24 and the clamping element 15 lying coaxially with respect to the pin element 25, in particular being rotatably mounted on the pin element 25, and preferably being substantially stationary in the axial direction with respect to the pin element 25.

Figure 4:
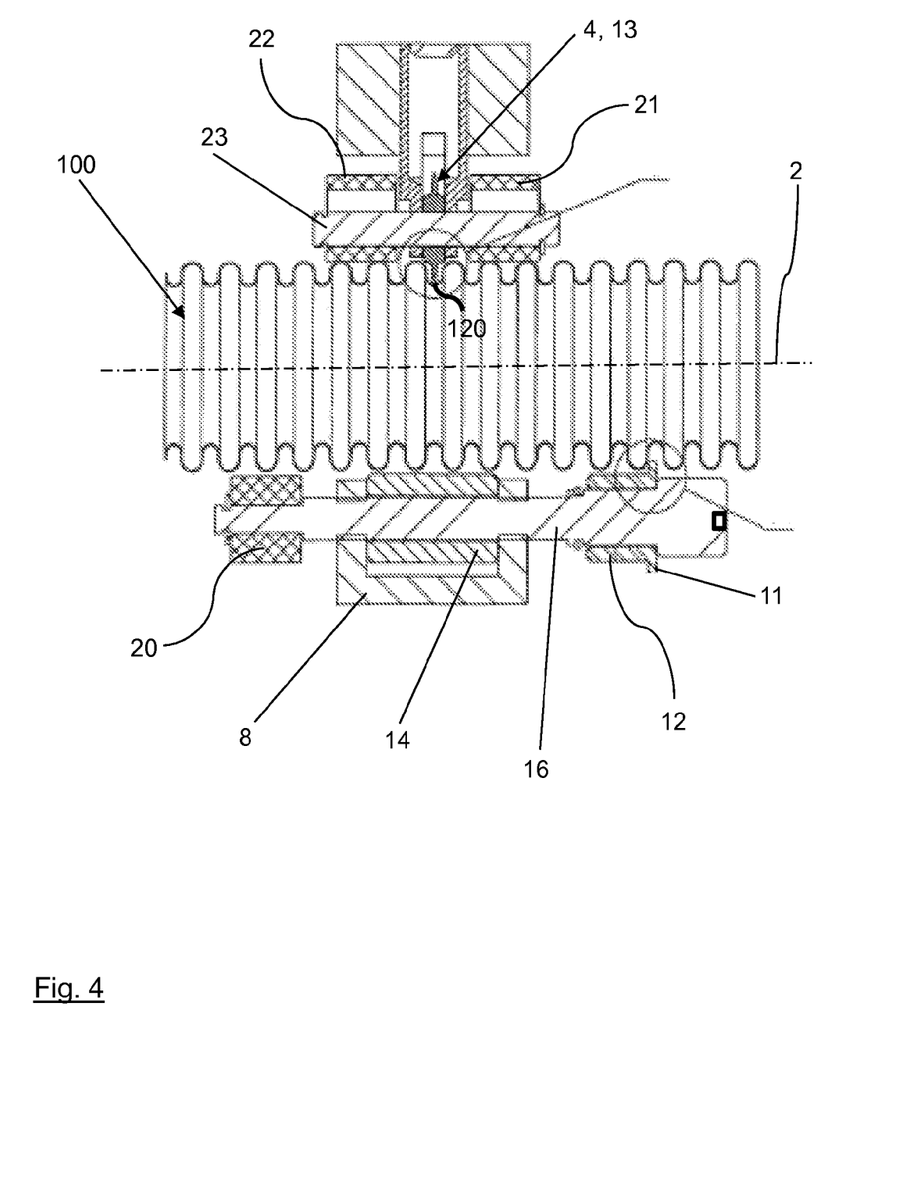
FIG. 4 shows the apparatus according to FIG. 1 together with a received corrugated pipe in a sectional view according to FIG. 2, the cutting tool of the apparatus engaging on the corrugation base of a corrugation of the corrugated pipe.

FIG. 4 shows the apparatus 1 according to FIGS. 1 and 2 in a sectional view in the manner of FIG. 2.

In contrast to the arrangement of the corrugated pipe 100 relative to the cutting tool 4 in FIG. 2, in FIG. 4, the corrugated pipe 100 is fixed in the machining position in such a way that the cutting tool 4 engages on the corrugation base 120 of a corrugation and the stop device 5 is thus made to abut against a side wall of a corrugation in the axial direction with respect to the axis 2. A lateral movement away in the axial direction of the corrugated pipe 100 and/or of the cutting tool 4 from the set cut position in the corrugation base 120 is thus avoided, as, during the separating process, a rotational movement between the corrugated pipe 100 and the apparatus 1 about the axis 2 takes place with guidance of the side wall on the stop device 5.

Figure 5:
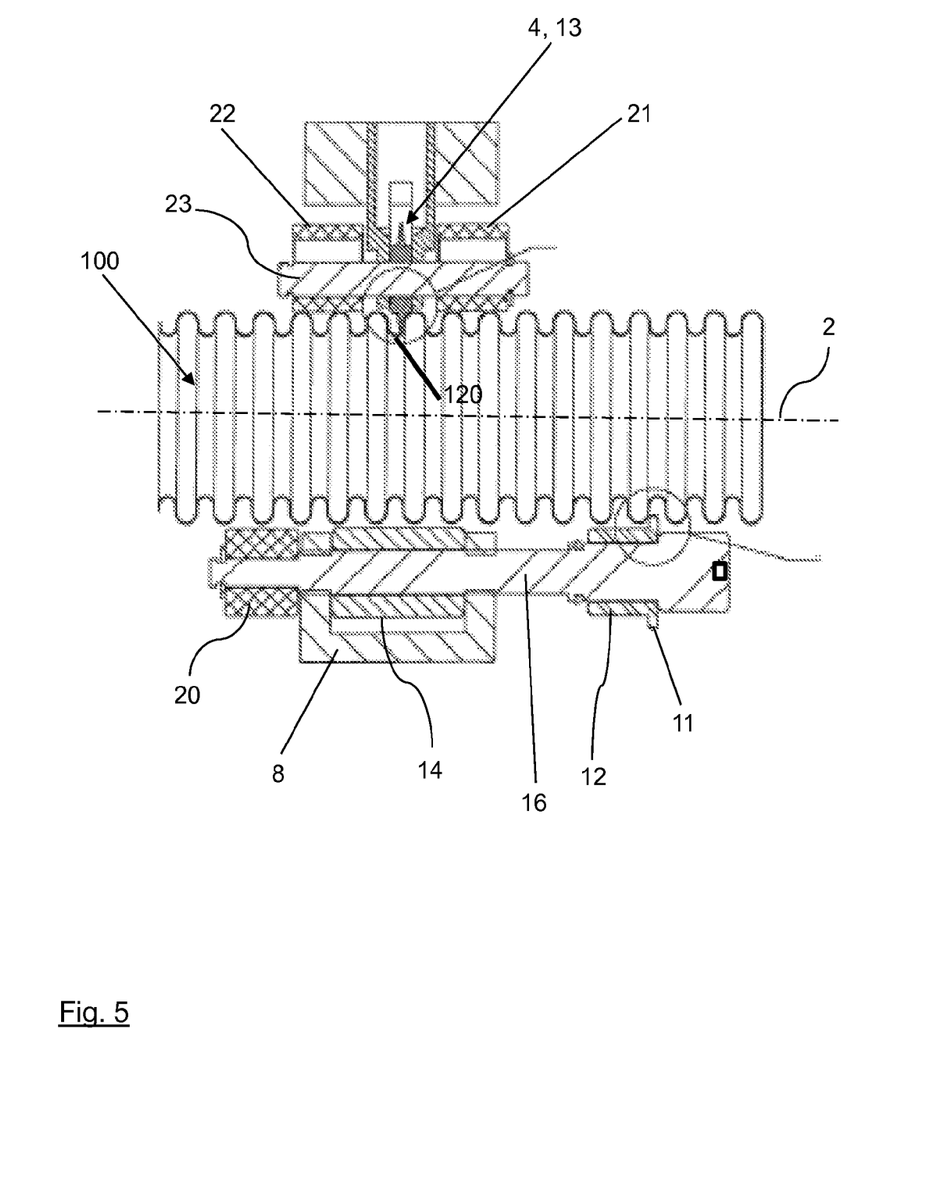
FIG. 5 shows the apparatus according to FIG. 1 together with a received corrugated pipe in a sectional view according to FIG. 2, the cutting tool of the apparatus engaging on a flank of a corrugation of the corrugated pipe.

FIG. 5 shows the apparatus 1 according to FIGS. 1 and 2 in a further sectional view in the manner of FIG. 2. In FIG. 5, the corrugated pipe 100 is clamped in the machining position such that the cutting tool 4 engages in a corrugation trough 110 of the corrugated pipe 100 and is moved until it abuts against the side wall or flank of one of the corrugations in the axial direction with respect to the axis 2. The orientation of the cutting tool 4 on the corrugated pipe 100 in the axial direction with respect to the axis 2 can be produced in that the stop device 5 has been adjusted to such an extent in the axial direction with respect to the axis 2 that the corrugated pipe 100 is present or clamped substantially without play in the axial direction with respect to the axis 2 between the cutting tool and the stop device 5. A separation substantially without a displacement of the cutting tool 4 in the axial direction thus takes place by means of a relative movement of the cutting tool 4 and corrugated pipe 100 relative to one another about the axis 2. A cut through the corrugated pipe 100 is therefore achieved substantially perpendicular to its centre axis or axis 2.

Figure 6:
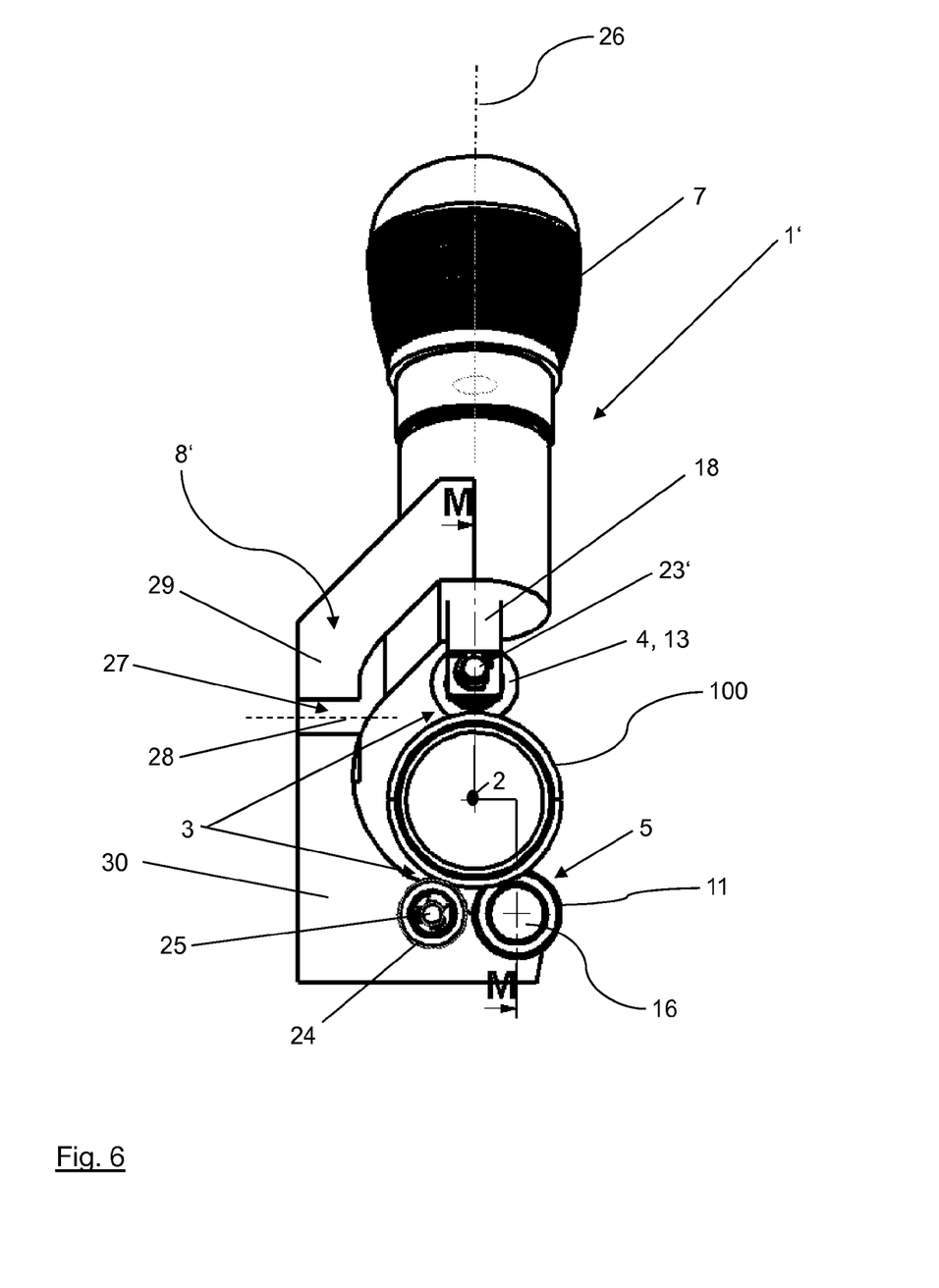
FIG. 6 shows a further possible configuration of an apparatus according to the invention for cutting corrugated pipes to length in a side view together with a received corrugated pipe.
Figure 7:
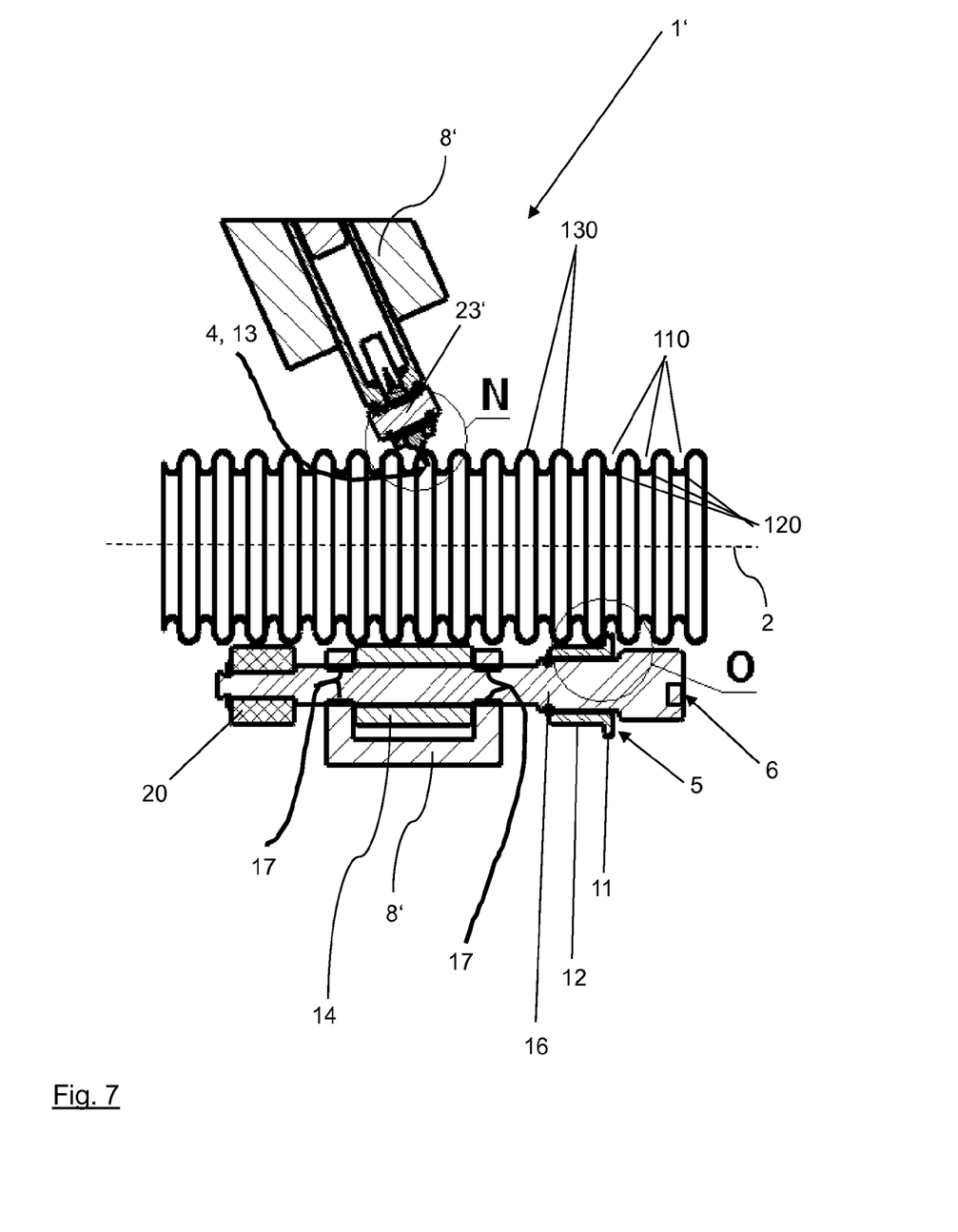
FIG. 7 shows the apparatus according to FIG. 6 in a sectional view along the section line M-M of FIG. 6 with a cutting tool engaging in the region of a corrugation apex of the corrugated pipe.

FIGS. 6 and 7 show a further possible embodiment of an apparatus 1' for cutting corrugated pipes to length in a different view. Components of the apparatus 1' according to FIGS. 6 and 7, which are identical to, or have the same function as, the components of the apparatus 1 according to FIGS. 1 to 5, are provided with the same reference numerals; to this extent, reference is made to the description of the apparatus 1 in FIGS. 1 to 5.

The apparatus 1' according to FIGS. 6 and 7 differs from the apparatus 1 according to FIGS. 1 to 5 inter alia by a joint device 27, by which the cutting tool 4 can be moved into an intended or desired oblique position with respect to the axis 2. The joint device 27 is preferably configured in such a way that the cutting tool 4 can also be moved into the desired oblique position when the corrugated pipe 100 is already fixed in the machining position.

The apparatus 1' has a base body 8', which is modified with respect to the base body 8 of the apparatus 1 and with which the joint device 27 is associated. The joint device 27 is preferably configured for this purpose as a pivot joint, which pivotably holds two parts 29 and 30 of the base body 8' in relation to one another about a pivot axis 28. The cutting tool 4 is associated with the part 29 and the clamping elements 14 and 15 of the clamping device 3 are associated with the part 30. In order to achieve the oblique position of the cutting tool 4, the pivot axis 28 is oriented substantially transversely to the axis 2 of the centre axis of the corrugated pipe 100.

Proceeding from a starting position, in which the cutting tool 4 is oriented substantially perpendicularly to the axis 2, the cutting tool 4 can be moved into a predetermined angular position in relation to the starting position by means of a pivoting movement about the pivot axis 28.

The joint device 27 preferably allows a pivoting movement about the pivoting axis 28 in the two rotational directions, so, proceeding from the starting position, the cutting tool 4 can be adjusted into a predetermined angular position a in one direction and into a predetermined angular position a in the other pivoting direction.

Figure 8A:
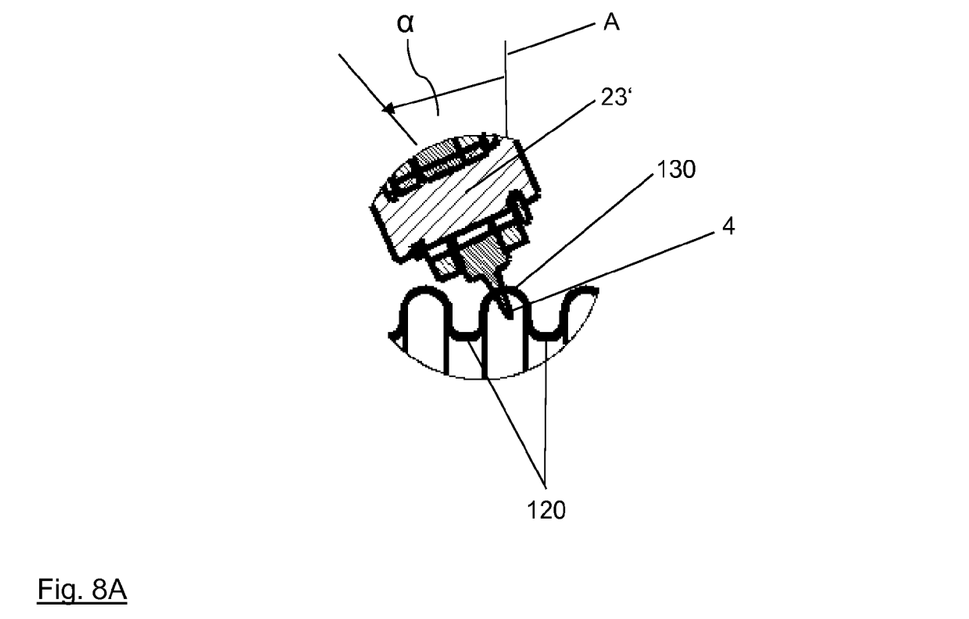
FIG. 8a shows an enlarged detailed view of the region N characterised in FIG. 7

As can be seen, in particular from FIG. 7 and from the enlarged detailed view of FIG. 8A, the orientation of the cutting tool 4 into an oblique position is particularly advisable when the corrugated pipe 100 is to be separated slightly offset with respect to the apex of a corrugation, for example in a rounded portion adjacent thereto of the corrugation and the cutting tool 4 is therefore to be moved into the cut position in this rounded region.

Figure 8B:
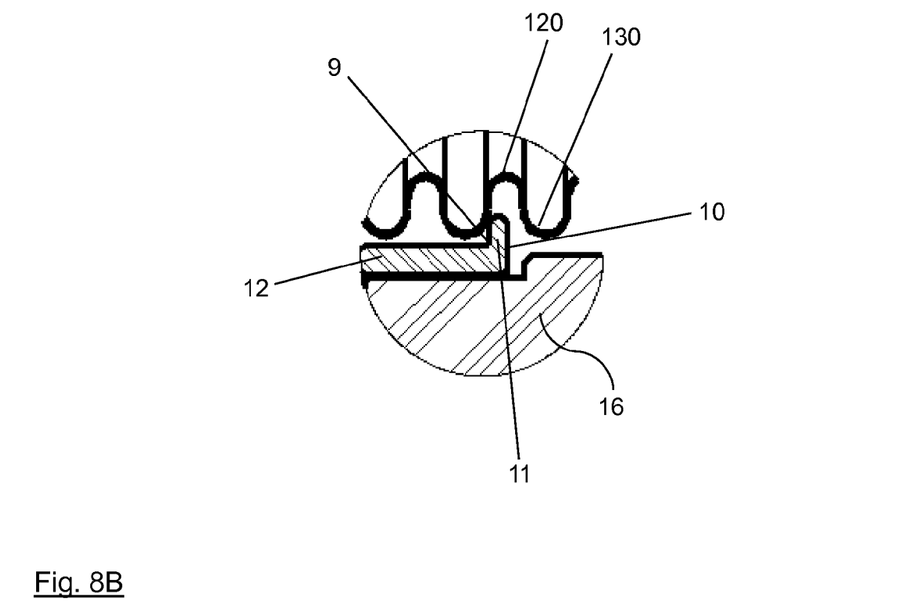
FIG. 8b shows an enlarged detailed view of the region 0 characterised in FIG. 7.

In this cut position of the cutting tool 4, a separation of the corrugated pipe 100 then takes place by means of the relative movement of the cutting tool 4 relative to the corrugated pipe 100 about the axis 2, the stop device 5 or the projection 11 configured as a collar acting against a flank of a corrugation (see, in particular, FIG. 8B) and the corrugated pipe 100 then remaining unchanged with respect to its axial orientation relative to the tool 4 during the cutting process.

Furthermore, the apparatus 1' according to FIGS. 6 and 7 differs from the apparatus 1 of FIGS. 1 to 5 inter alia in that the support and/or guide elements 21 and 22 preferably provided in the apparatus 1 are left out in the apparatus 1'. To this extent, the apparatus 1 has a pin element 23', which acts as a rotational axis for the cutting tool 4 and is shortened compared to the pin element 23 of the apparatus 1. As a result of this and due to the absent support and/or guide elements on the pin element 23', the free space for movement in the region of the cutting tool 4 is enlarged in the apparatus 1', as any support and/or guide elements on the pin element 23' do not hinder an oblique positioning of the cutting tool 4.

The cutting tool 4 is preferably pivotable by means of the joint device 27 about an angle α of up to about 45 to 50 degrees, proceeding from the starting position. For better understanding, FIG. 8A, by way of example, shows the starting position by a line characterised by B, and the angle α.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOL LIST 1 apparatus
1' apparatus
2 axis
3 clamping device
4 cutting tool
5 stop device
6 adjusting device
7 handle part
8 base body
8' base body
9 stop face
10 stop face
11 projection
12 support and/or guide element
13 clamping element
14 clamping element
15 clamping element
16 bolt having a thread
17 counter-thread
18 guide element
19 arrow
20 support and/or guide element
21 support and/or guide element
22 support and/or guide element
23 pin element
23' pin element
24 support and/or guide element
25 pin element
26 longitudinal axis
27 joint device
28 pivot axis
29 part
30 part
α angle
A starting position
100 corrugated pipe
110 corrugation trough
120 corrugation base
130 corrugation apex

The invention claimed is:

1. An apparatus for cutting corrugated pipes to length, said cutting apparatus comprising:

a clamping device configured to act radially with respect to an axis so as to fix a corrugated pipe in a machining position, the clamping device comprising at least two rollers which are circumferentially distributed around the corrugated pipe, each of the at least two rollers having a cylindrical outer surface defining a maximum diameter along a width of the roller;

a cutting tool coupled to the clamping device and configured to move into an active position against the corrugated pipe so that a separation is caused by moving the cutting tool along an outer periphery of the corrugated pipe;

wherein the cutting tool is configured as a rotatably movable cutting wheel which, rotating about its centre axis, rolls on the outer periphery of the corrugated pipe in a course of a separating process;

a lateral stop element having an outward projection having a thickness configured to engage in a corrugation trough of the corrugated pipe, and to act as a stop against a flank of a corrugation of the corrugated pipe, wherein a spacing between the cutting tool and the lateral stop element is variable in an axial direction with respect to the axis; and an adjusting device coupled with the lateral stop element and configured to adjust the spacing between the cutting tool and the lateral stop element in the axial direction in such a way that in the machining position of the corrugated pipe, the lateral stop element is brought into a stop position, wherein in the stop position, the lateral stop element abuts against one flank of one corrugation of the corrugated pipe, wherein the width of each of the at least two rollers along the maximum diameter is more than twice the thickness of the outward projection of the lateral stop element.

2. The cutting apparatus recited in claim 1, wherein the axis coincides with a centre axis of the corrugated pipe.

3. The cutting apparatus recited in claim 1, wherein, when the corrugated pipe is fixed or the cutting tool is moved into the active position on the corrugated pipe, the lateral stop element, with respect to the spacing in relation to the cutting tool, is variable in the axial direction with respect to the axis.

4. The cutting apparatus recited in claim 1, wherein the adjusting device comprises a screw mechanism configured to move the lateral stop element into a predetermined stop position.

5. The cutting apparatus recited in claim 1, wherein the lateral stop element is arranged on a base body having a handle part.

6. The cutting apparatus recited in claim 5, wherein the lateral stop element is movably mounted on the base body in the axial direction with respect to the axis.

7. The cutting apparatus recited in claim 1, wherein the lateral stop element comprises a cylindrical stop and has at least one stop face (9, 10) which is movable against a flank of a corrugation of the corrugated pipe in the machining position.

8. The cutting apparatus recited in claim 1, wherein the lateral stop element has two stop faces which are selectively movable against flanks, directed in an opposite manner to one another, of adjacent corrugations in the machining position.

9. The cutting apparatus recited in claim 1, wherein the lateral stop element is coaxially arranged with respect to a clamping element of the clamping device.

10. The cutting apparatus recited in claim 1, wherein the lateral stop element is rotatably mounted on a threaded bolt, which is in cooperation with a counter-thread of a base body, so as to be moveable in the axial direction with respect to the axis.

11. The cutting apparatus recited in claim 1, wherein the lateral stop element is formed by a rotatably movable roller and the outward projection is formed by an outwardly projecting collar.

12. The cutting apparatus recited in claim 1, wherein the clamping device has at least one clamping element movable substantially radially with respect to the axis formed by the cutting tool.

13. The cutting apparatus recited in claim 1, further comprising a joint device configured to move the cutting tool into a predeterminable oblique position with respect to the axis.

14. The cutting apparatus recited in claim 13, wherein the joint device is formed by a pivot joint arranged on a base body, the pivot joint being configured to move a part of the base body holding the cutting tool relative to a part holding at least one clamping element of the clamping device about a pivot axis running substantially transversely to the axis into a predetermined angular position.

15. The cutting apparatus as in claim 1, wherein the adjusting device is positioned adjacent to said lateral stop element.

16. The cutting apparatus as in claim 15, wherein said lateral stop element and said adjustment device are coupled to a bolt.

17. The cutting apparatus as in claim 1 wherein said clamping device comprises a plurality of clamping elements with at least one clamping element being positioned opposite said adjusting device.

18. The apparatus as in claim 1, wherein the lateral stop element is a cylindrical stop and is configured to rotate about its longitudinal axis so that one end face of the cylindrical stop slides along a side wall of the one corrugation of the corrugated pipe and thereby the cutting wheel is guided in the axial direction with respect to the axis in the course of a separation process of the corrugated pipe by a rotational movement of the cutting wheel about the axis relative to the corrugated pipe.

19. The apparatus as in claim 1, wherein the lateral stop element is configured to move translationally along a motion axis in order to change the spacing between the cutting tool and the lateral stop element in the axial direction with respect to the axis, wherein the motion axis is arranged axially offset to the cutting wheel.

20. The apparatus as in claim 1,
wherein the cutting apparatus comprises at least one support element configured to guide the corrugated pipe in a radial direction during the separation process and arranged in a region of the cutting tool, wherein the cutting tool and the at least one support element is mounted on a common pin element; and
wherein the at least one support element has an inner periphery, a diameter of which is greater than an external diameter of the pin element, so the at least one support element has a desired play relative to the pin element in the radial direction to allow the cutting tool to enter a wall of the corrugated pipe on a corrugation apex or a corrugation base of the corrugation pipe.

21. The apparatus as in claim 1, wherein the cutting apparatus comprises at least one support element which is configured to use as a support for the corrugated pipe and to move axially with respect to the axis.

22. The apparatus as in claim 1, further comprising a handle, wherein said handle is configured to translationally move the cutting tool and the clamping device.

23. The apparatus as in claim 1, wherein the apparatus comprises a single lateral stop element having a stop face which abuts a flank of a corrugation of the corrugation pipe.

24. The arrangement as in claim 1, wherein the stop position of the lateral stop element is selected such that the separation is caused by moving the cutting tool along an apex of the corrugated pipe.

25. Arrangement comprising an apparatus for cutting corrugated pipes to length and having one corrugated pipe to be cut to length, wherein said corrugated pipe is brought into a machining position to the cutting apparatus, said cutting apparatus comprising:
a clamping device configured to act radially with respect to an axis so as to fix the one corrugated pipe in the machining position, wherein the clamping device is configured to be moved into an active position in a peripherally clamping manner against apexes of the corrugated pipe so that the corrugate pipe is fixed by at least one roller having a cylindrical outer surface defining a maximum diameter along a width of the roller;
a cutting tool configured such that it is movable into an active position against the one corrugated pipe in the machining position, so that a separation is caused by moving the cutting tool along the one corrugated pipe;
wherein the cutting tool is configured as a rotatably movable cutting wheel which, rotating about its center axis, rolls on an outer periphery of the one corrugated pipe in a course of the separating process;

a lateral stop element having an outward projection having a thickness less than half of the width of the roller along the maximum diameter, the lateral stop element being configured to engage in a corrugation trough of the corrugated pipe and is presented in a stop position, wherein in the stop position the lateral stop element abuts against a flank of a corrugation of the corrugated pipe, wherein a spacing between the cutting tool and the lateral stop element has been changed in an axial direction with respect to a centre axis of the corrugated pipe in order to achieve the stop position, and an adjusting device, by means of which the lateral stop element is brought into the stop position.

26. The arrangement as in claim 25 wherein the lateral stop element is a cylindrical stop and is configured to rotate about its longitudinal axis so that one end face of the cylindrical stop slides along a side wall of the one corrugation of the corrugated pipe and thereby the cutting wheel is guided in the axial direction with respect to the axis in the course of a separation process of the corrugated pipe by a rotational movement of the cutting wheel about the axis relative to the corrugated pipe.

* * * * *